(12) United States Patent
Moeller et al.

(10) Patent No.: US 9,069,885 B1
(45) Date of Patent: Jun. 30, 2015

(54) SYSTEMS AND METHODS FOR AUTOMATED RETRIEVAL, MONITORING, AND STORAGE OF ONLINE CONTENT

(75) Inventors: David Moeller, Atlanta, GA (US); Jonathan Manuzak, Atlanta, GA (US); Jonah Stein, Berkeley, CA (US); Jonathan Hochman, Atlanta, GA (US)

(73) Assignee: CodeGuard, Inc., Atlanta, GA (US)

( * ) Notice: Subject to any disclaimer, the term of this patent is extended or adjusted under 35 U.S.C. 154(b) by 54 days.

(21) Appl. No.: 13/303,629

(22) Filed: Nov. 23, 2011

Related U.S. Application Data

(60) Provisional application No. 61/417,371, filed on Nov. 26, 2010.

(51) Int. Cl.
| | |
|---|---|
| G06F 7/00 | (2006.01) |
| G06F 17/00 | (2006.01) |
| G06F 17/30 | (2006.01) |
| G06F 11/14 | (2006.01) |

(52) U.S. Cl.
CPC ...... *G06F 17/30997* (2013.01); *G06F 11/1448* (2013.01)

(58) Field of Classification Search
None
See application file for complete search history.

(56) References Cited

U.S. PATENT DOCUMENTS

| | | | |
|---|---|---|---|
| 6,947,959 B1 * | 9/2005 | Gill | 715/202 |
| 2002/0056031 A1 * | 5/2002 | Skiba et al. | 711/162 |
| 2008/0034039 A1 * | 2/2008 | Cisler et al. | 709/204 |

* cited by examiner

*Primary Examiner* — Usmaan Saeed
*Assistant Examiner* — Michele Choi
(74) *Attorney, Agent, or Firm* — Morris, Manning & Martin, LLP; Daniel E. Sineway, Esq.

(57) ABSTRACT

Systems and methods for automated retrieval, monitoring, and storage of online digital content, wherein such content includes source code and files for hosting websites, audio files, video files, data files, system files, image files, or any other content that is typically stored in third party servers. A content retrieval system hosted on a physical server or a cloud continuously monitors user data hosted on a third party server for changes to the data. The method involves creation of an index list that is updated periodically to keep track of changes to the metadata associated with the user's content. Such an approach saves time and valuable resources to individuals and/or organizations enabling them to perform periodic monitoring of their data, and enabling rollback to a previous version of their data whenever needed. The system additionally monitors user content for malicious attacks and hacks, and provides notification alerts relating to the same.

13 Claims, 15 Drawing Sheets

SYSTEM OVERVIEW

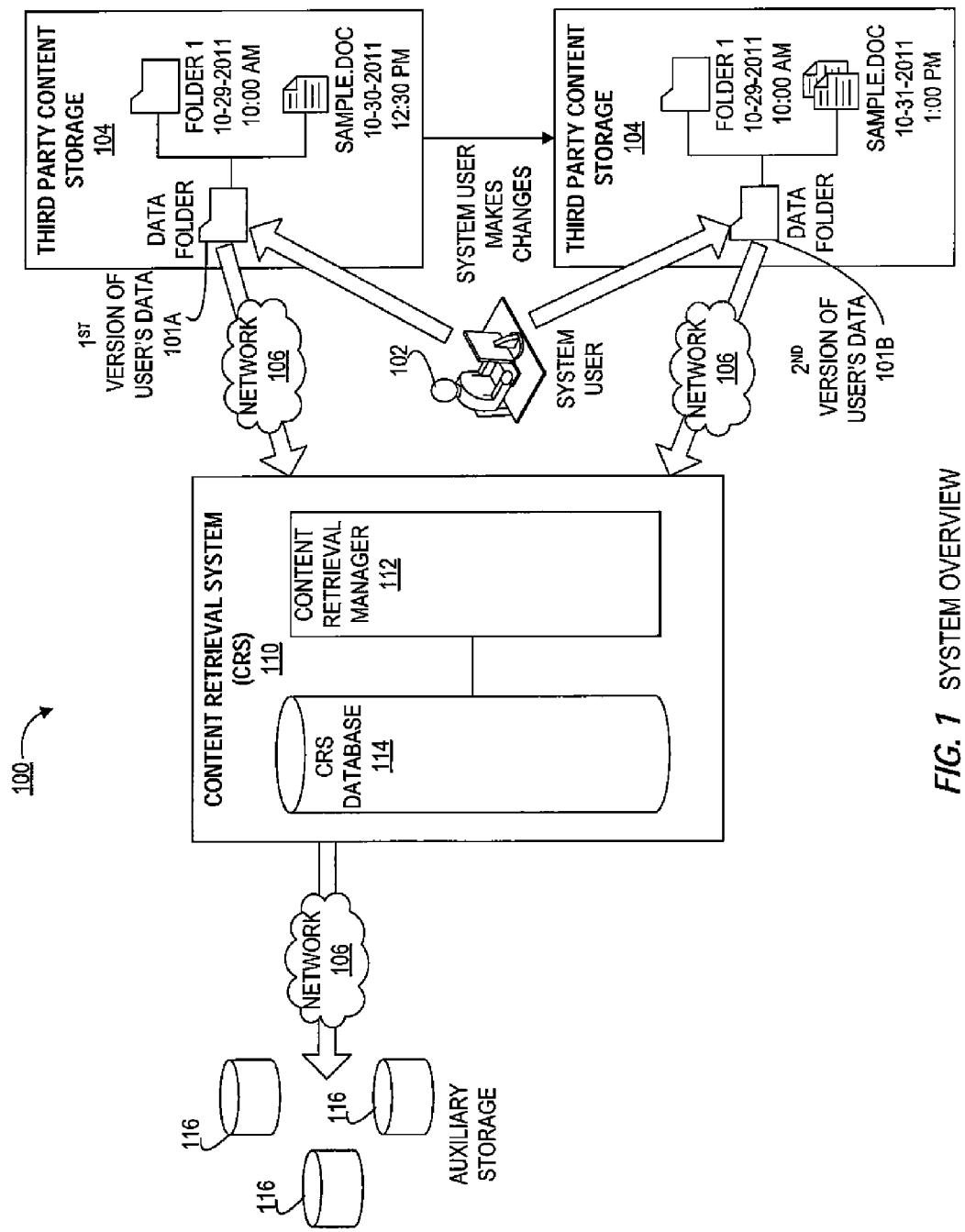
FIG. 1 SYSTEM OVERVIEW

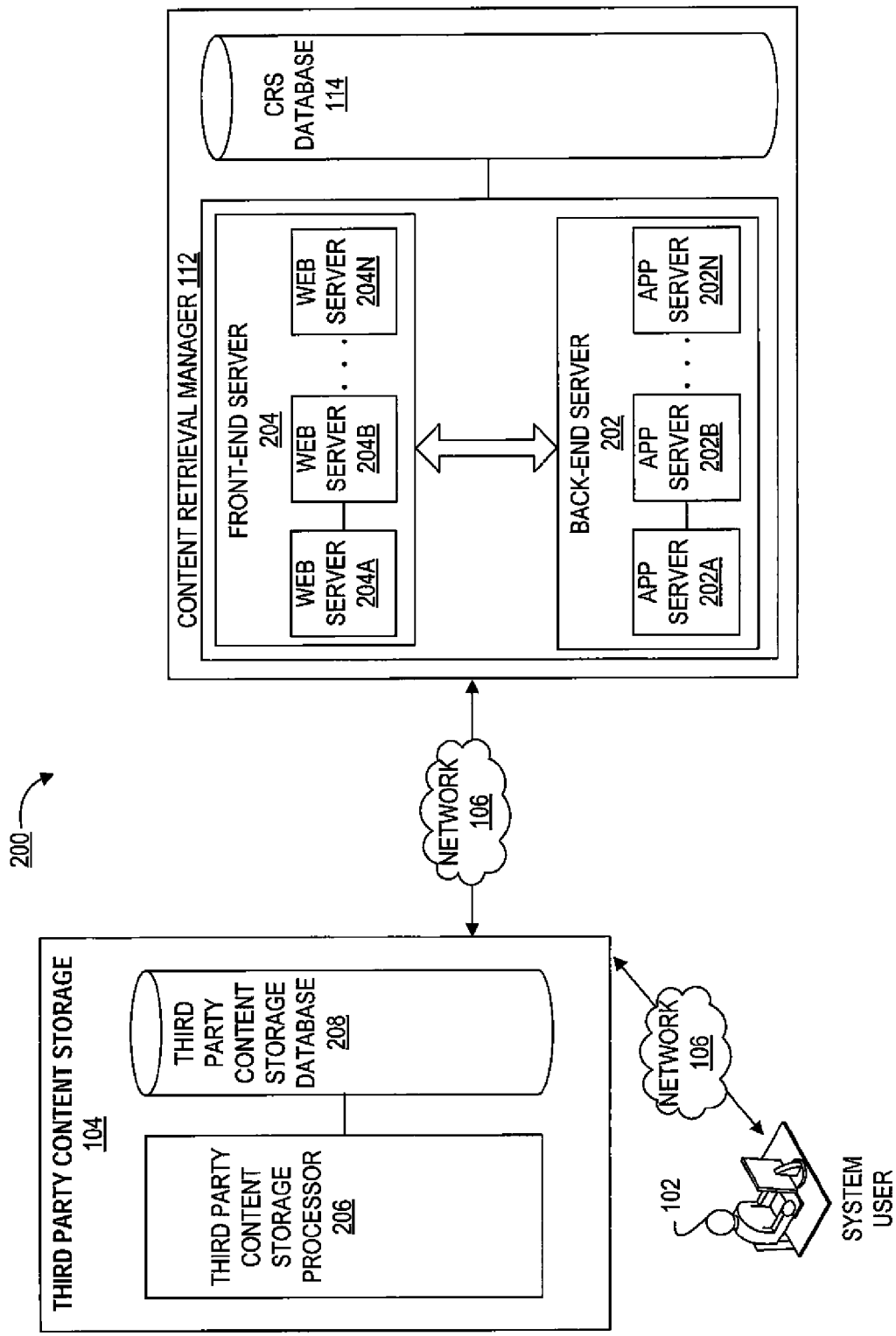
*FIG. 2* SYSTEM ARCHITECTURE

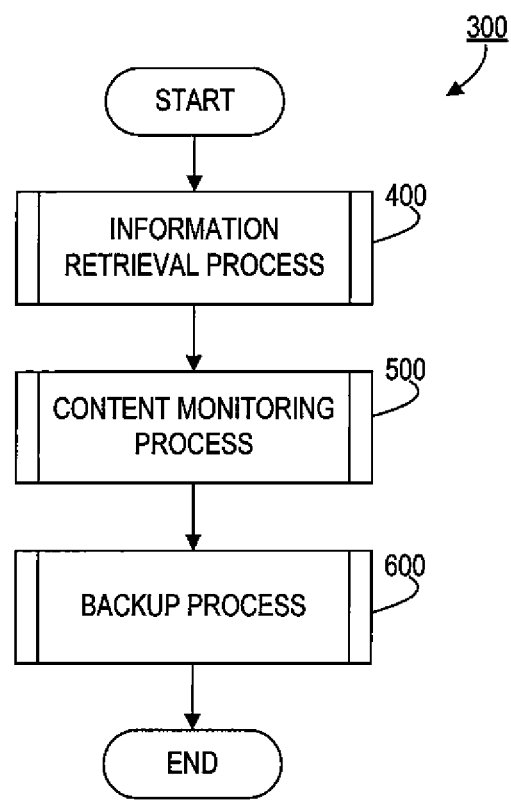
FIG. 3 EXEMPLARY CRS PROCESS

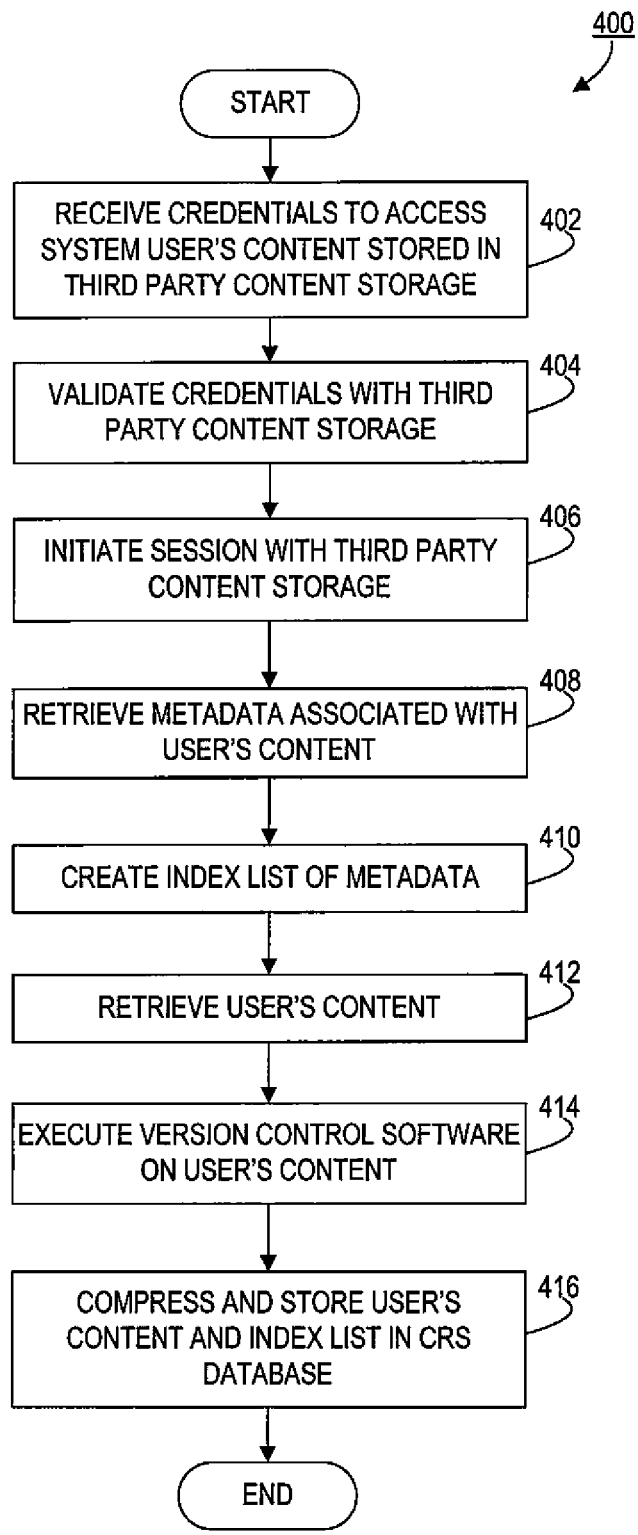
*FIG. 4* EXEMPLARY INITIAL INFORMATION RETRIEVAL PROCESS

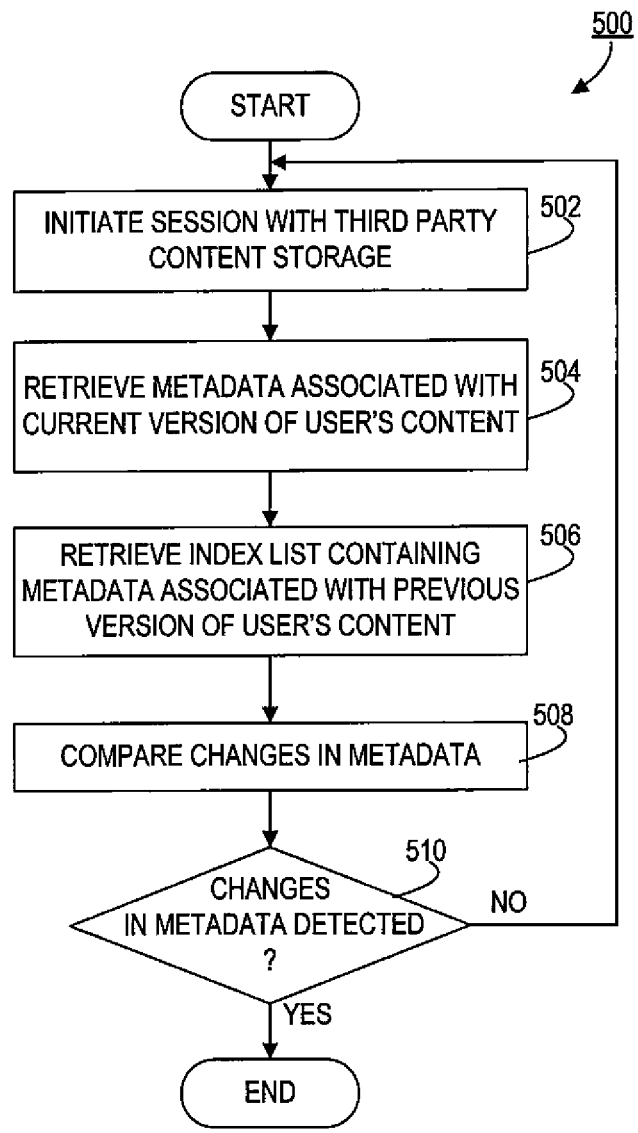
*FIG. 5* EXEMPLARY MONITORING PROCESS

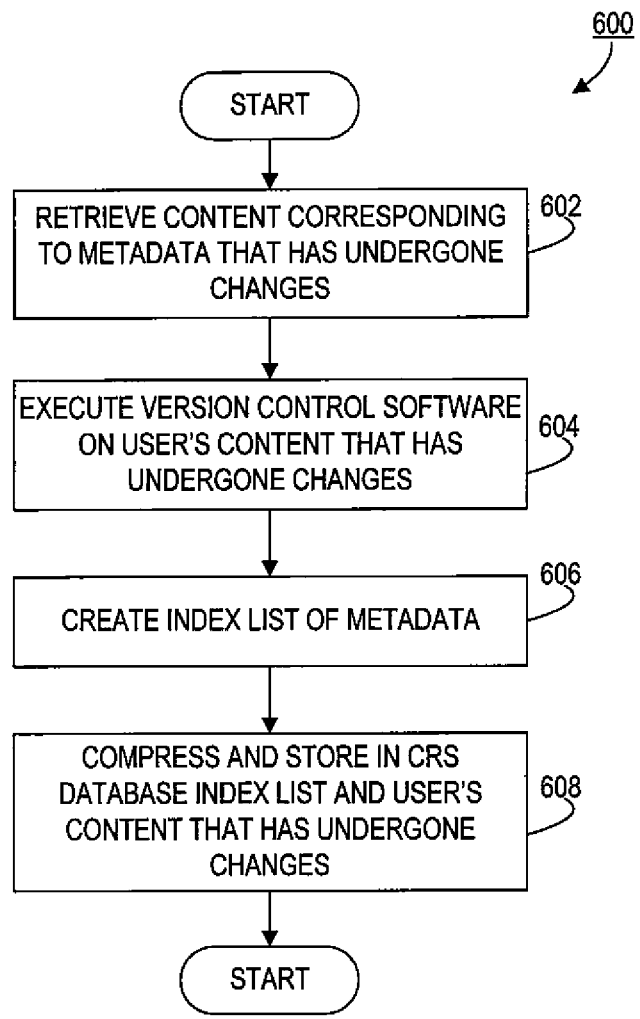
*FIG. 6* EXEMPLARY BACKUP PROCESS

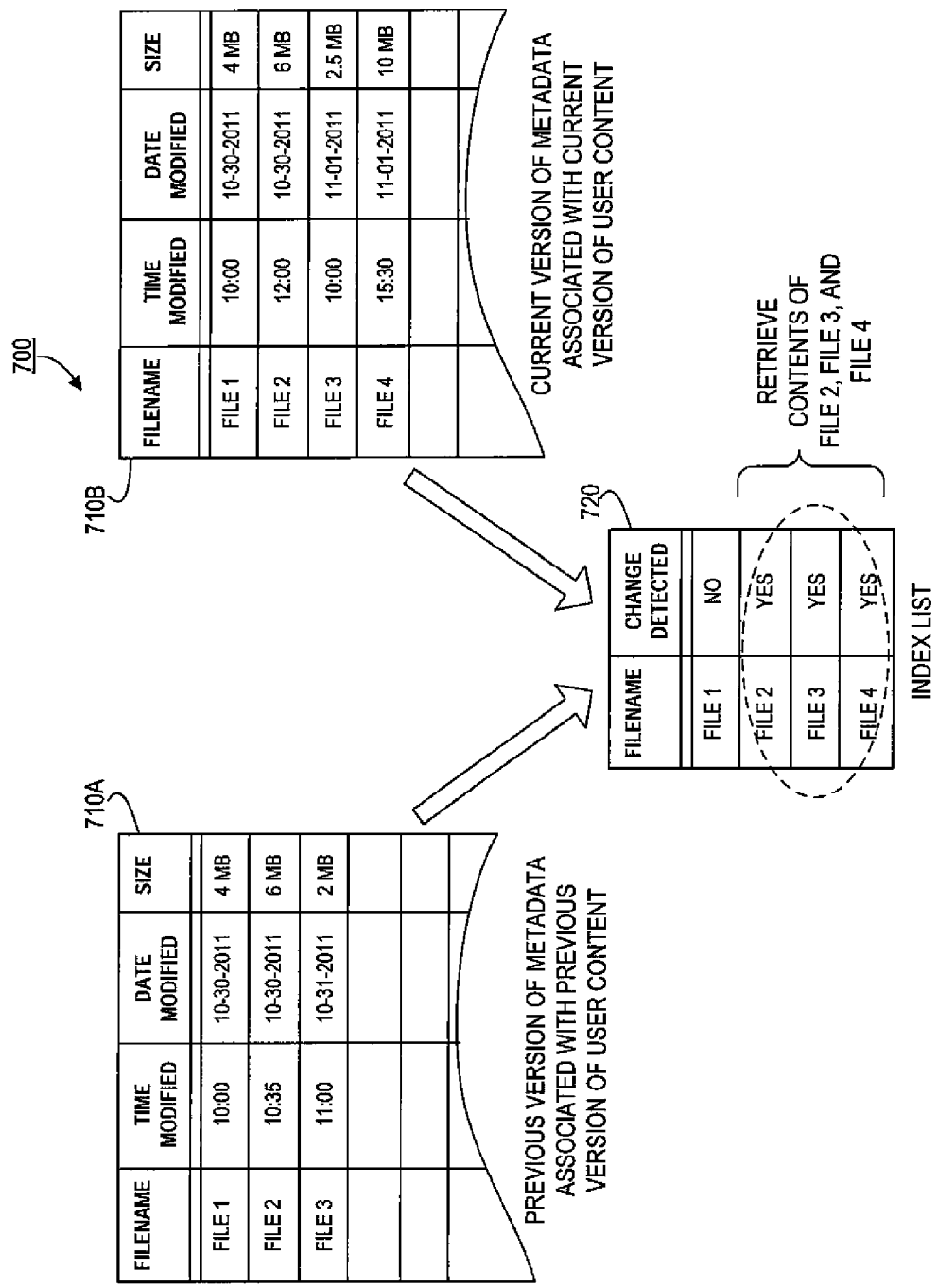
FIG. 7 INDEX LIST CREATION

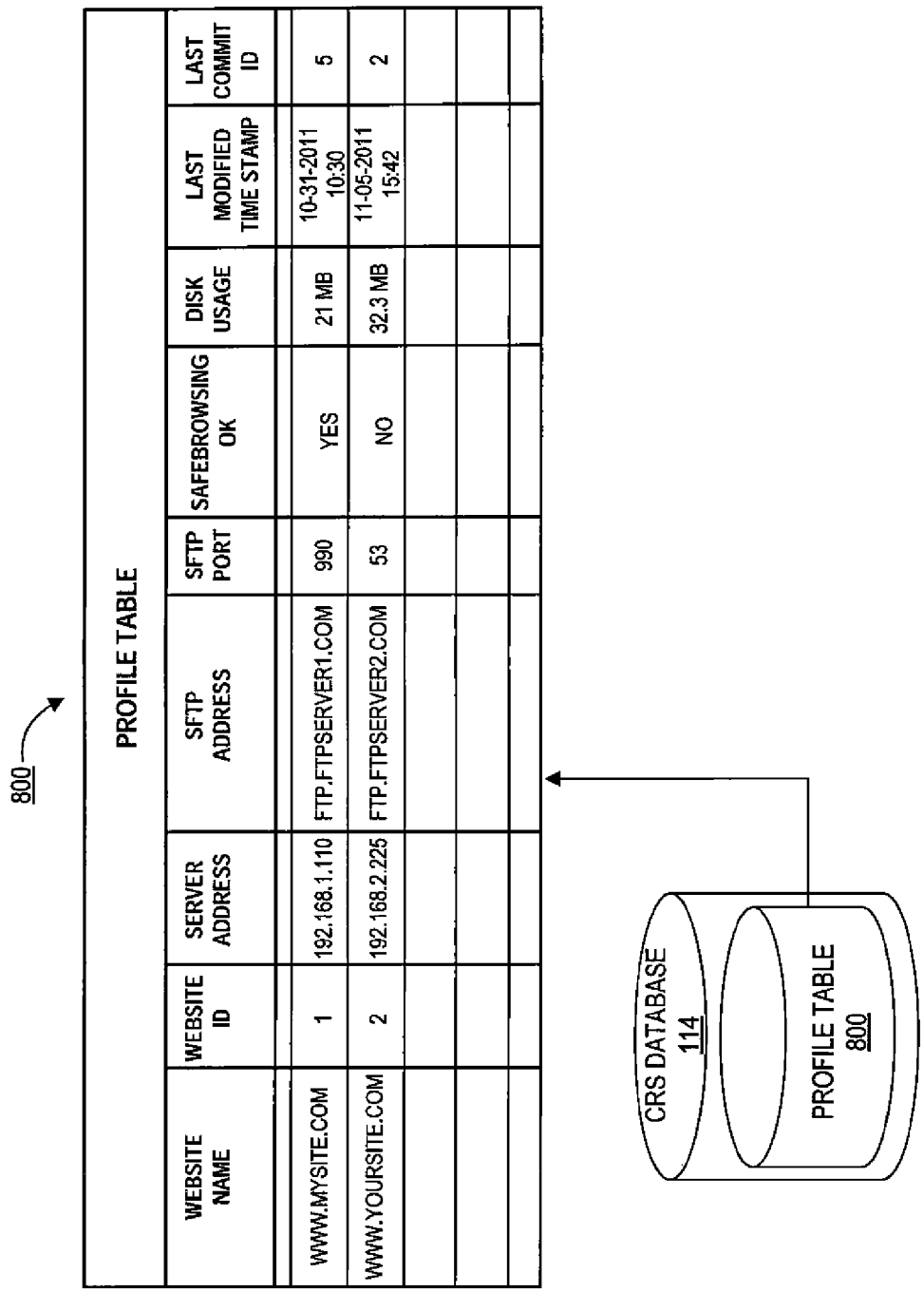
FIG. 8 EXEMPLARY PROFILE TABLE

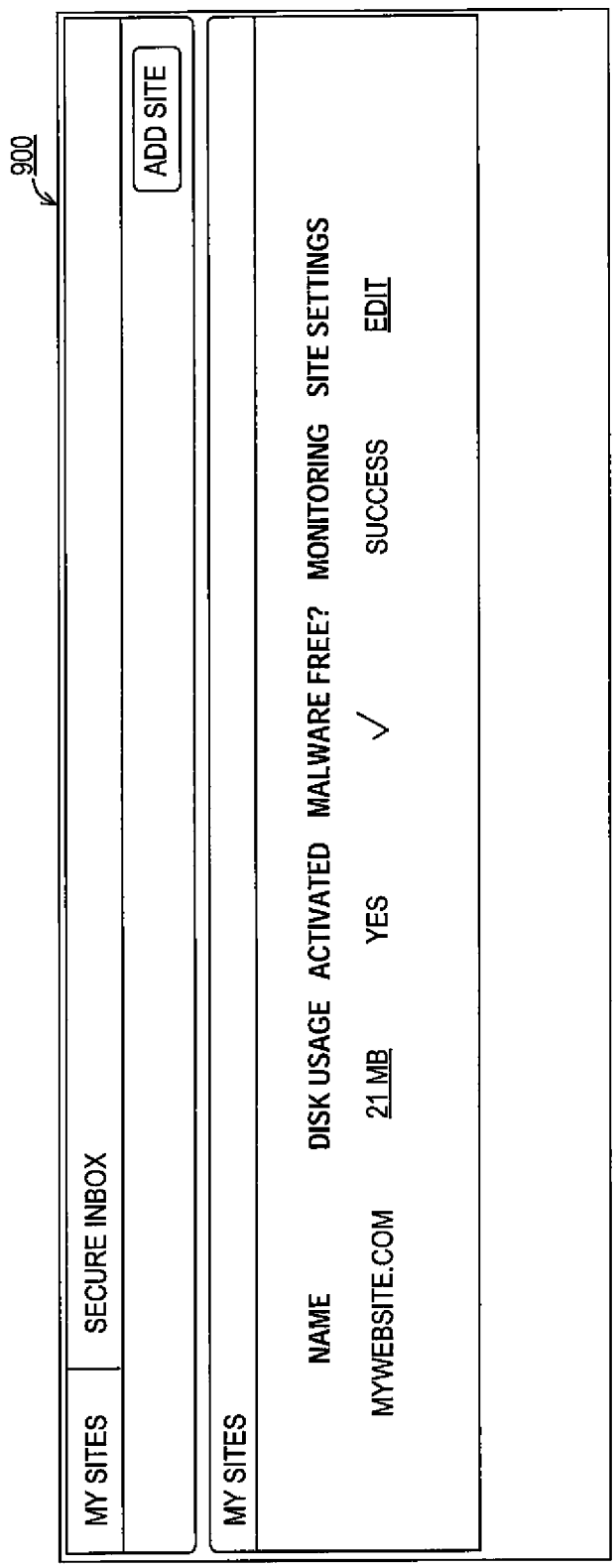
FIG. 9 EXEMPLARY CRS INTERFACE

```
┌─────────────────────────────────────────────────────────────┐
│                                              ┌1000          │
│  ┌──────────┬──────────────┐                                │
│  │ MY SITES │ SECURE INBOX │                                │
│  ├──────────┴──────────────┴──────────────────┬───────────┐ │
│  │ MYWEBSITE.COM                              │ ADD SITE  │ │
│  ├────────────────────────────────────────────┴───────────┤ │
│  │ ACCESS CONTROL                                         │ │
│  ├──────────────────┐                                     │ │
│  │ SERVER SETTINGS  │                                     │ │
│  │   WEBSITE URL                                          │ │
│  │   ┌────────────────────────────────────────┐           │ │
│  │   │ MYWEBSITE.COM                          │           │ │
│  │   └────────────────────────────────────────┘           │ │
│  │   DESTINATION FTP URL OR IP (E.G., FTP.TEST.COM OR     │ │
│  │                               192.162.0.103)           │ │
│  │   ┌────────────────────────────────────────┐           │ │
│  │   │ MYWEBSITE.COM                          │           │ │
│  │   └────────────────────────────────────────┘           │ │
│  │   ACCOUNT                                              │ │
│  │   ┌────────────────────────────────────────┐           │ │
│  │   │ U62941792-TEST                         │           │ │
│  │   └────────────────────────────────────────┘           │ │
│  │   PASSWORD                                             │ │
│  │   ┌────────────────────────────────────────┐           │ │
│  │   │ ********                               │           │ │
│  │   └────────────────────────────────────────┘           │ │
│  │   NOTIFICATION ENABLED                                 │ │
│  │   ☑ ENABLE E-MAIL NOTIFICATION                         │ │
│  │   SET THE TYPE OF CONNECTION TO NORMAL FTP OR          │ │
│  │                               SECURE-FTP (SFTP)        │ │
│  │   ⊙ FTP                                                │ │
│  │   ○ SFTP                                               │ │
│  │   USING A NON-STANDARD SFTP PORT? ┌────────┐           │ │
│  │                                   └────────┘           │ │
│  │   PATH TO UPLOAD TO (E.G. PUBLIC HTML/SITE OR BLANK)   │ │
│  │   ┌────────────────────────────────────────┐           │ │
│  │   │ MYWEBSITE.NET                          │           │ │
│  │   └────────────────────────────────────────┘           │ │
│  │   (CHECK THE DIRECTORY BEFORE CLICKING UPDATE BUTTON.) │ │
│  │   ┌─────────────────┐                                  │ │
│  │   │ CHECK DIRECTORY │                                  │ │
│  │   └─────────────────┘                                  │ │
│  │   LISTING OF:                                          │ │
│  │   ⊟ 📁 MYWEBSITE.COM / MYWEBSITE.NET                   │ │
│  │       ├── 📄 .HTACCESS                                 │ │
│  │       ├── 📄 CODE ZONE.CPANEL PLUGIN                   │ │
│  │       ├── 📄 INDEX.PHP                                 │ │
│  │       ├── 📁 LOG                                       │ │
│  │       └── 📁 TMP-ADMIN                                 │ │
│  │                                      ┌────────┐        │ │
│  │                                      │ UPDATE │        │ │
│  │                                      └────────┘        │ │
│  └────────────────────────────────────────────────────────┘ │
└─────────────────────────────────────────────────────────────┘
```

*FIG. 10* EXEMPLARY SETTINGS TO ACCESS USER CONTENT
STORED ON THIRD PARTY SERVER(S)

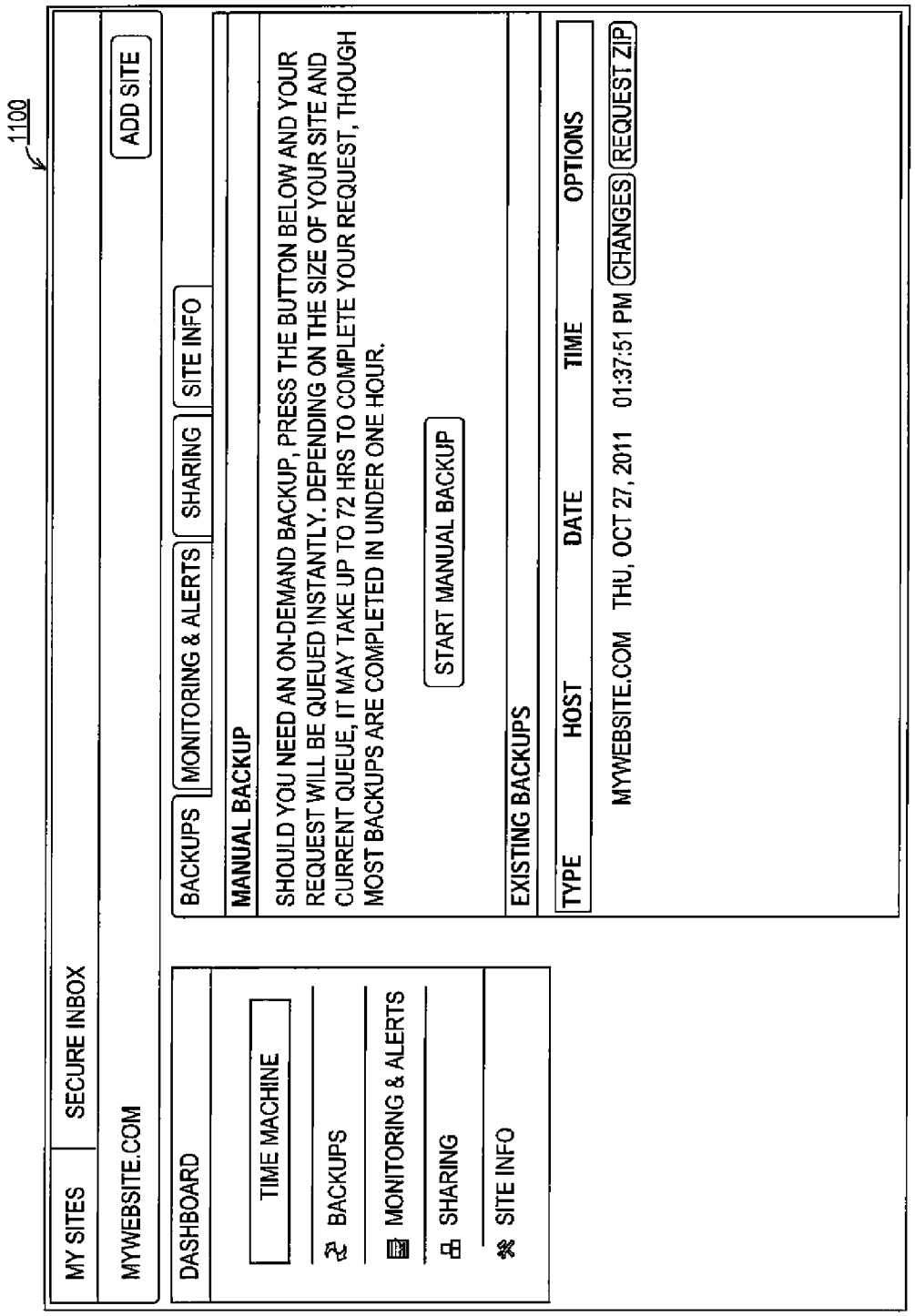
FIG. 11  EXEMPLARY SETTINGS TO MANUALLY BACKUP USER CONTENT

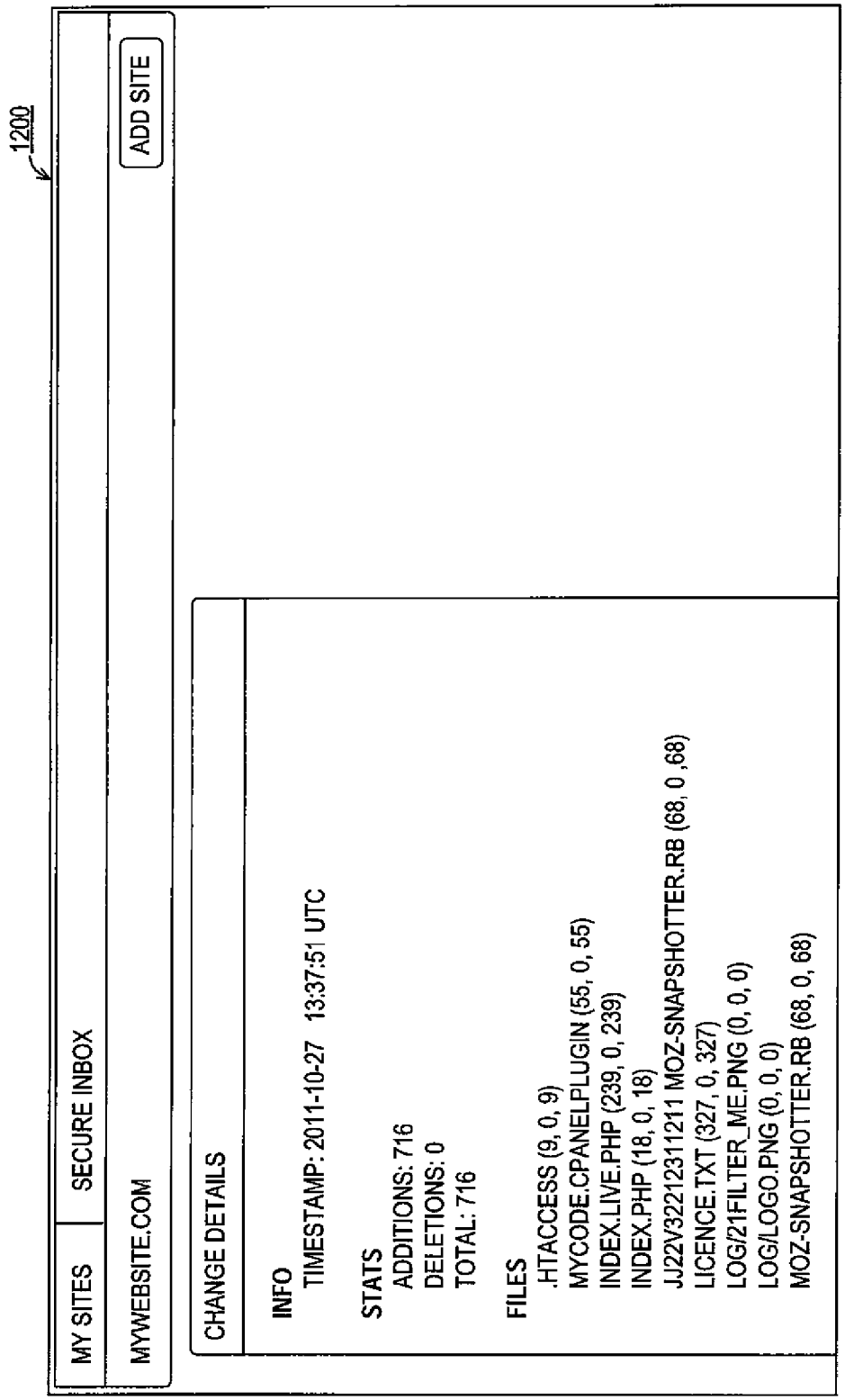
*FIG. 12* EXEMPLARY LIST OF MODIFIED CONTENTS

| MY SITES | SECURE INBOX |

MYWEBSITE.COM                                           ADD SITE

DASHBOARD | BACKUPS | MONITORING & ALERTS | SHARING | SITE INFO

TIME MACHINE

BACKUP FREQUENCY

HOW OFTEN DO YOU WANT YOUR WEBSITE TO BE MONITORED AND BACKED UP?

○ NEVER
◉ DAILY                    UPDATE

- BACKUPS
- MONITORING & ALERTS
- SHARING
- SITE INFO

EMAIL NOTIFICATIONS

WOULD YOU LIKE TO BE INFORMED VIA EMAIL WHEN AN ACTION IS PERFORMED OR UPDATED CONTENT ON YOUR WEBSITE IS DISCOVERED?

○ YES, SEND EMAIL NOTIFIERS
○ NO, DO NOT SEND EMAIL NOTIFIERS          UPDATE

NOTIFICATION FILTERING

THERE ARE MANY COMMON TYPES OF FILES LIKE LOGS, CACHE, AND STATISTICS THAT CHANGE FREQUENTLY. BY DEFAULT, WE STILL BACK THESE UP, BUT WE DON'T NOTIFY YOU EVERY TIME THEY CHANGE.

◉ YES, FILTER MY NOTIFICATION EMAILS
○ NO, NOTIFY ME WHEN ANY FILE CHANGES       UPDATE

*FIG. 13* EXEMPLARY CRS INTERFACE FOR CONFIGURING NOTIFICATION ALERTS

FIG. 14 EXEMPLARY CRS INTERFACE SHOWING SUMMARY OF MONITORING OF USER CONTENT

*FIG. 15* EXEMPLARY CRS INTERFACE SHOWING VARIOUS NOTIFICATION ALERTS

SYSTEMS AND METHODS FOR AUTOMATED RETRIEVAL, MONITORING, AND STORAGE OF ONLINE CONTENT

CROSS REFERENCE TO RELATED APPLICATION

This application claims benefit under 35 U.S.C. §119(e) of U.S. Provisional Patent Application No. 61/417,371, filed Nov. 26, 2010, and entitled "Website File Monitoring and Version Control System", which is incorporated herein by reference as if set forth herein in its entirety.

TECHNICAL FIELD

The present disclosure relates generally to systems and methods involved in the automated retrieval and storage of online digital content, particularly related to systems and methods for the retrieval, monitoring, backup, and storage of online digital content, wherein such content exemplarily includes source code and files for hosting websites, audio files, video files, data files, system files, image files, or any other types of content that are typically stored in third party servers.

BACKGROUND

Many organizations, corporate entities and private individuals make use of automated backup systems to backup and store data. Such automated backup systems are usually offered by third party providers as periodic backup services either for free or, a one time service charge, or sometimes a periodic fee charged weekly, monthly or yearly. Data stored in the backup systems can help in restoring individual files, folders, or even the entire system in the event the original copy of the data becomes corrupted, lost, unreliable, or is unavailable for any other reason. Such events can be the result of intentional malicious hacking attacks by hackers, or, even unforeseen system crashes. In many scenarios, data stored in backup systems is shared (e.g., software code) and reused by developers and technical persons who utilize backup systems to access a current version or a previous version of the stored data.

For performing backups, most conventional backup systems retrieve a current working version of the data and store the data in its entirety. In other words, if a backup system performs an hourly backup of a website, then the backup system stores a complete working version of the website every hour. However, this approach is disadvantageous because it can easily lead to large amounts of data being stored in the backup systems, and thus necessitates continuously increasing backup storage space.

In several scenarios, version control software (also called revision control systems) such as GIT, APACHE SUBVERSION, other open source software programs are used for performing backups. These software programs allow management and systematic tracking of changes (revisions) to data including documents, source code and other information stored as computer files. Changes are usually identified by a number and/or letter code combination, wherein such a combination is termed as a "revision number", "revision level", "commit id", or simply "revision". For example, an original first version of file a might be called "revision 1". After a first set of changes are made and saved, the resulting version might be termed as "revision 2", and so on. Each revision is generally associated with a timestamp and a username of the person making the change. Version control software can be used to identify differences between two versions, restore a present version to a previously stored version, and with some types of files, two versions can even be merged.

Notwithstanding the aforementioned benefits, most version control software programs cannot perform manipulations and comparisons on metadata associated with the user's data. Thus, version control software programs perform a complete backup of the end user's data, every time a change in user's data is identified. Further, even most data storage providers (third party storage providers) who merely offer storage space also perform a complete backup of the end user's data, every time a backup is performed. Furthermore, most third party storage providers (such as website hosting providers) utilize graphical user interfaces and sophisticated automation tools designed to allow end users with several options and features associated with hosting a website. However, such graphical user interfaces and automation tools can be quite complicated and even cumbersome, and usually differ from one third party storage provider to another. Additionally, most website owners use publishing platforms such as WORDPRESS™ to create blogs and websites. Such platforms periodically release software updates, and it is typically the expectation of third party storage providers or website storage providers that website owners install updates when they are released, or deal with the consequences otherwise—which unfortunately can be somewhat dire for small and medium-sized businesses, e.g., once a website site has been hacked, traffic drops and revenue drops.

Therefore, there is a long-felt but unresolved need for a streamlined system or method that allows in automated retrieval and storage of online digital content, wherein such content is owned by users (businesses and individuals) and is stored on third party storage providers. If the user's data relates to website hosting data, then the retrieval process provides the ability to rollback to a previous version of the website, whenever needed. In order to make optimum use of storage space, a preferred retrieval process saves data only when a change is detected in the user's data. Further, the system should notify webmasters, system administrators, website owners, and/or other relevant persons when changes are detected in the retrieved data. An ideal retrieval process should not consume too much time, and should be able to be performed easily by individuals with minimal technical skills, and further can be repeated more than once, as necessary. Also, the system should allow users to setup multiple user accounts to retrieve and backup data relating to multiple websites, wherein the data can be stored at the same or different third party storage providers. Additionally, the system performing the retrieval should periodically ascertain the "health" and reliability of the retrieval data, e.g., whether the data has been exposed to phishing or malware activities. In the event a hack or an unauthorized change is detected, webmasters can quickly revert to the last known "good" version and have their site working in minutes without engaging a developers to remediate the issue.

BRIEF SUMMARY

Briefly described, and according to one embodiment, aspects of the present disclosure generally relate to systems and methods for the automated retrieval, monitoring, and storage of online content stored in third party servers, using an embodiment of a Content Retrieval System (CRS) that is hosted on a computer server at a physical location or virtually. Aspects of the present disclosure include providing individuals and/or organizations the ability to retrieve previously stored versions of data, and perform automated periodic monitoring of their data via the CRS. User's data (user's content) monitored by the CRS include user's content such as source code, files for hosting websites, audio files, video files, data files, system files, image files, or any other content that is typically stored in third party servers.

Aspects of the present disclosure include a monitoring process during which the CRS scans a current version of the user's data stored on the third party servers, and the last stored version of the data in the CRS, for changes. Specifically speaking, and according to one aspect, the CRS detects changes by comparing metadata associated with the user's data. According to another aspect, and as will be discussed in greater detail herein later, changes in metadata are indicated in an index list that is created by the CRS. In the event that one or more changes are detected in the metadata, the CRS creates the index list, and saves the changes incrementally within an exemplary CRS database. Additionally, the CRS also saves the index list (in an exemplary CRS database) for use in a subsequent monitoring process. According to one aspect, the CRS notifies webmasters, system administrators, website owners, and/or other relevant persons when changes are detected in the user's contents. In an exemplary aspect, the CRS additionally provides summary reports (and related analytics) of the detected changes via email, text messages, MMS, etc.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIG. 1 illustrates an overview of an embodiment of a Content Retrieval System (CRS) involved in the automated retrieval and storage of online digital content, wherein such content is typically stored in third party servers.

FIG. 2 shows an exemplary CRS architecture comprising various software modules, engines and other similar elements, according to one embodiment of the present system.

FIG. 3 is a flowchart showing a summary of high-level, computer-implemented method steps illustrating the overall CRS process, performed by various software modules and engines of the CRS.

FIG. 4 is a flowchart showing an exemplary computer-implemented process for retrieving information from third party servers, according to one embodiment of the present system.

FIG. 5 is a flowchart showing an exemplary computer-implemented process for monitoring content stored in third party servers, according to one embodiment of the present system.

FIG. 6 is a flowchart showing an exemplary computer-implemented process for backing up content retrieved from third party servers, according to one embodiment of the present system.

FIG. 7 is a schematic representing the creation of an exemplary index list, according to one embodiment of the present system.

FIG. 8 is an exemplary CRS data table storing several variables in connection with user's content stored in third party servers, used in connection with one embodiment of the present system.

FIG. 9 is a screenshot of an exemplary CRS interface showing an overview of user's content stored in third party servers, according to one embodiment of the present system.

FIG. 10 is a screenshot of an exemplary CRS interface showing various settings/options associated with retrieval of content stored in third party servers, according to one embodiment of the present system.

FIG. 11 is a screenshot of an exemplary CRS interface showing various settings/options associated with manual (user-initiated) backup of content stored in third party servers, according to one embodiment of the present system.

FIG. 12 is a screenshot of an exemplary CRS interface showing exemplary files (comprising user's content stored in third party servers) that have undergone changes, according to one embodiment of the present system.

FIG. 13 is a screenshot of an exemplary CRS interface showing various CRS settings/options associated with providing notification alerts, according to one embodiment of the present system.

FIG. 14 is a screenshot of an exemplary CRS interface showing a summary of a monitoring process performed on user's content stored in third party servers, according to one embodiment of the present system.

FIG. 15 is a screenshot of an exemplary CRS interface showing various notification alerts that are provided by the CRS to system administrators, web masters, and/or website owners summarizing the effects of monitoring of user's content stored in third party servers, according to one embodiment of the present system.

DETAILED DESCRIPTION OF DRAWINGS

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Aspects of the present disclosure relate to systems and methods for automated retrieval, monitoring, and storage of online content stored in third party servers, using an embodiment of a Content Retrieval System (CRS). Additionally, aspects of the present disclosure include providing individuals and/or organizations the ability to retrieve previously stored versions of data, and perform automated periodic monitoring of their data by the CRS. Data monitored by the CRS includes user's content such as source code, files for hosting websites, audio files, video files, data files, system files, image files, or any other content that are typically stored in third party servers. Aspects of the present disclosure include a monitoring process during which the CRS scans a current version of the user's data stored on the third party servers, and the last stored version of the data in the CRS, for changes. Specifically speaking, and according to one aspect, the CRS detects changes by comparing metadata associated with the user's data. According to another aspect, and as will be discussed in greater detail herein later, changes in metadata are indicated in an index list that is created by the CRS. In the event that one or more changes are detected in the metadata, the CRS creates the index list, and saves the changes incrementally in an auxiliary storage space associated with the CRS. Additionally, the CRS also saves the index list (in an exemplary CRS database) for use in a subsequent monitoring process. According to one aspect, the CRS notifies webmasters, system administrators, website owners, and/or other relevant persons when changes are detected in the user's contents. In an exemplary aspect, the CRS additionally provides summary reports (and related analytics) of the detected changes via email, text messages, MMS, etc.

According to an aspect, the CRS periodically monitors the user's content (stored in the third party servers) for phishing or malware activities. In the event a hack or an unauthorized change is detected, webmasters or website owners or system users can retrieve a previously stored version of the data stored in the CRS, and use that data for partial restoration or complete restoration, as needed.

Referring now to the figures, FIG. 1 illustrates an overview 100 of an embodiment of a content retrieval system (CRS) 110 in an exemplary environment, constructed and operated in accordance with various aspects of the present disclosure. According to one embodiment, system users, or simply, users 102 store their data on servers owned and operated by Third Party Content Storage 104. It will be understood that Third Party Content Storage 104 includes website hosting providers, Internet Service Providers (ISPs), or any other system that hosts and/or stores data belonging to system users. It will be further understood that system users include individuals who own data, webmasters or system administrators of organizations, or any other persons who store and have access to their data on Third Party Content Storage 104. Users typically establish a user account with user credentials by registering with a Third Party Content Storage 104. For purposes of this disclosure, the term "third party servers" is considered generally synonymous with Third Party Content Storage 104.

According to one embodiment of the present disclosure, a CRS 110 is used to perform automated retrieval, monitoring, and backup of the content (data of system users 102) hosted in Third Party Storage 104. According to another embodiment, a CRS 110 comprises a Content Retrieval Manager 112 and a CRS database 114. As will be described in greater detail later herein, and in one exemplary aspect, the Content Retrieval Manager 112 is a software module (or, collection of software modules) that retrieves and monitors user's data stored in Third Party Storage 104 for intentional and unintentional changes in user's data. According to an embodiment of the present disclosure, exemplary attributes relating to the user's data such as (by way of example) a network address of the third party servers, a time corresponding to a most recent modification of the user's data, metadata associated with the user's data, and various other types of information are stored in the CRS database 114. For example, a data table showing various attributes (stored in CRS database 114) relating to a user's website (data) belonging to a system user, is displayed in FIG. 8.

Typically, communication between users' computers/computing devices and the Third Party Storage 104 proceeds through a network 106 using a service such as a Web-deployed service with client/service architecture, a corporate Local Area Network (LAN) or Wide Area Network (WAN), the Internet, or through a cloud-based system. Further, as will be understood and appreciated, various networking components like routers, switches, hubs etc., are typically involved in communication between users' computers/computing devices and Third Party Storage 104. Although not shown in FIG. 1, it can also be further understood that such communication may include one or more gateways/firewalls that provide information security from unwarranted intrusions and cyber attacks.

As shown in FIG. 1, a system user 102 accesses his or her data stored in Third Party Storage 104 and makes changes to the data. Exemplarily speaking, a 1st version of the data, 101A is changed into a 2nd version, 101B after the user makes changes. According to a specific example as shown, 101A is a data folder comprising a folder called Folder1, and a file called sample.doc. Further, it is also shown that the contents in Folder1 were last modified on 10-29-2011 at 10:00 AM, and the contents of sample.doc were last modified on 10-30-2011 at 12:30 PM.

As shown and according to one aspect, system users 102 (or webmasters/system administrators affiliated with third party servers) provide a user's access credentials to the CRS 110 and thereafter the CRS 110 accesses the Third Party Storage 104 (remotely over networks 106) using such credentials. It will be understood that the first time the CRS 110 accesses the user's data, it stores the user's data in a CRS database 114 or in an auxiliary storage 116. According to one aspect, auxiliary storage 116 includes secondary storage that is external to the CRS, and can even involve data storage units available commercially from data storage providers. Subsequently the system user 102 makes changes to the user's data 101A, for example, the contents of the sample.doc file. Consequently, and as shown, the user's current data 101B comprises folder1 (which is unchanged from its previous 101A version) and a modified sample.doc file that was last modified on 10-31-2011 at 1:00 pm. As will be understood, the CRS 110 periodically monitors the user's data on Third Party Storage 104, and hence, detects changes in the data. Such monitoring can be performed every day, every other day, hourly, or at any other predetermined time interval.

According to one aspect, the CRS 110 creates an index list (discussed in greater detail in FIG. 7) based on the metadata associated with the 101A and 101B versions of the user's data. This way of tracking changes in the user's data using the associated metadata facilitates in optimum usage of storage space and bandwidth. As will be understood, during a subsequent periodic monitoring phase, the CRS 110 uses the pre-stored index list to determine whether or not changes have occurred to the user's content. For example, the index list identifies changes to names of files, types of files, times when files were modified, etc.

It will be understood that the aforementioned index list provides the advantage of detecting changes easily. In other words, the metadata information in the index list allows the CRS 110 to determine quickly and with minimal resources whether or not changes have occurred to the user's content, as opposed to comparing the content in two revisions line by line, which as will be understood, is time and resource intensive.

If one or more changes in the metadata are detected, then according to one aspect, the CRS 110 retrieves content corresponding to metadata that has undergone changes. Then, the CRS 110 applies version control software (for example, GIT™) to create a compressed repository comprising the incremental differences of the content between the most recently pre-stored version (in CRS 110) and a current version of the user's data. In one example, the incremental differences of the contents in 101A and 101B are backed up by the CRS and stored as a compressed repository (archive) in an auxiliary storage database 116. As will be understood and appreciated, most conventional version control software programs maintain an automated list of changes that have occurred within every revision and a location (on disk) pointing to the last unchanged version of the file. Such a list, in conjunction with the compressed archives generated by the CRS 110, can be used to restore a current version to a previously stored version of the user's data. According to one exemplary aspect, the CRS 110 names the compressed repository change_ID_N_sample_tar.gz, where N corresponds to a revision number after a user changes the stored contents. Future changes are exemplarily named change_ID_(N+1)_sample_tar.gz, change_ID_(N+2)_sample_tar.gz, and so on, to account for the corresponding revisions. As will be understood and appreciated, the repositories can be named differently, and not limited to the names discussed herein. According to another aspect, the CRS 110 stores the compressed repository in an exemplary CRS database 114. As will be apparent to one of ordinary skill, CRS databases 114 and auxiliary databases 116 can be virtual (in the "cloud"), or can include physical storage units/data centers.

According to yet another aspect, communication between the Third Party Storage 104 and the CRS proceeds via dedicated Application Programming Interfaces (API's), or via a web interface. Typically, and as will be understood, such communication involves a secure data transfer session using protocols such as FTP, SFTP, SSH, and other protocols. Details of an exemplary CRS process will be explained with flowcharts in connection with FIGS. 3-6. Alternatively, and in one aspect, if no changes are detected in the user's data during a monitoring process, the CRS 110 takes no further action. As will be understood, the compressed repositories can be used to generate or re-create any previous version of the user's data.

Figure 14:
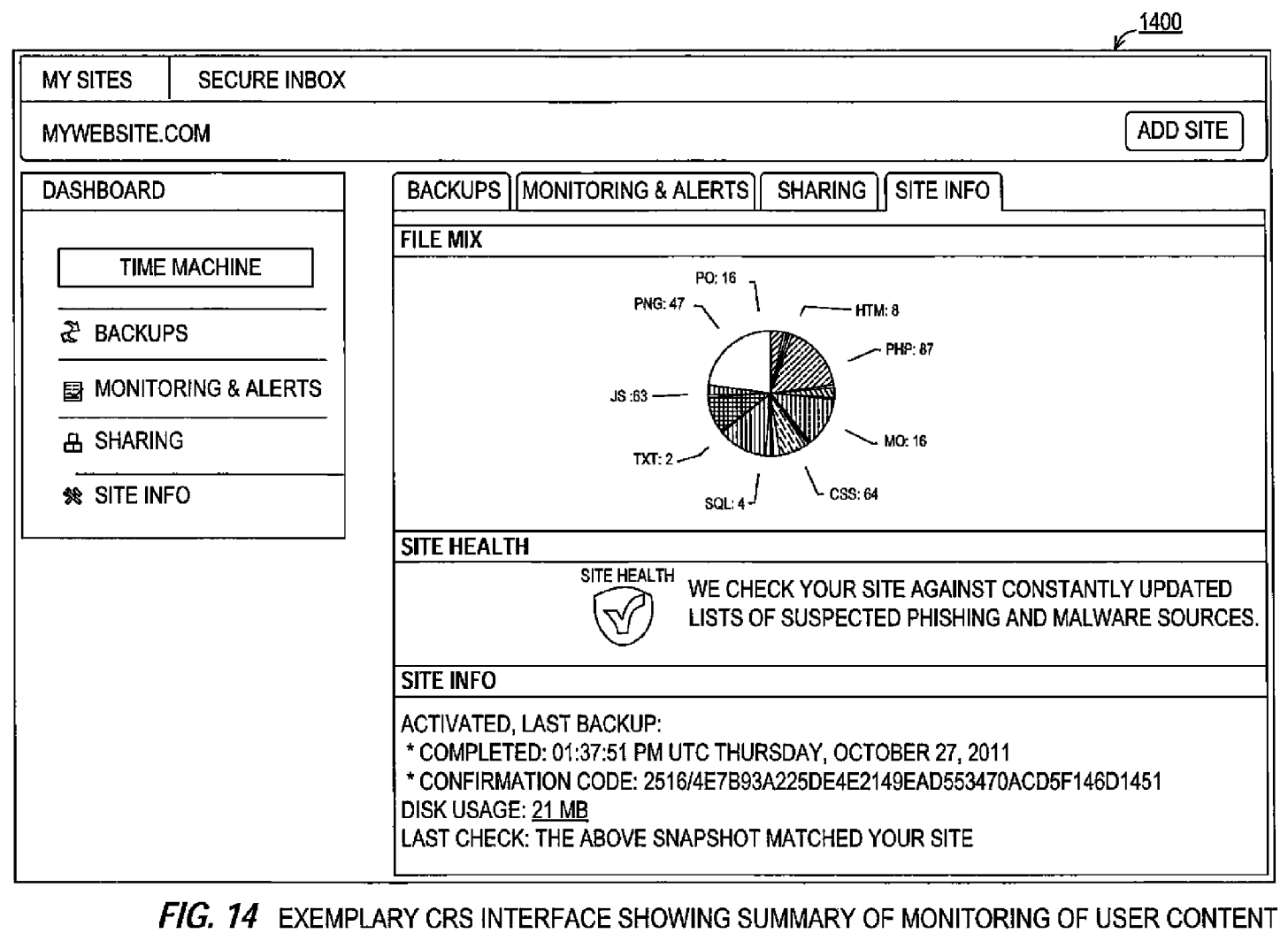

A screenshot of an exemplary CRS interface is shown in FIG. 9. Screenshots showing various CRS settings/options associated with retrieval of content stored in third party servers are shown in FIGS. 10-13. An exemplary list of various files (comprising a user's data) that have undergone changes is shown in FIG. 12. According to one aspect, the CRS 110 provides a summary of a summary of a monitoring process performed on user's content stored in third party servers. An exemplary screenshot displaying such a summary is shown in FIG. 14. According to another aspect, the CRS provides to system administrators, web masters, and/or website owners summarizing the effects of monitoring of user's content stored in third party servers. A screenshot showing exemplary alerts is shown in FIG. 15.

As will be understood, the above-mentioned screenshots and flowcharts discussed herein are for illustrative purposes only. The discussion above in association with FIG. 1 is intended to merely provide an overview of an embodiment of the present system for automated retrieval, monitoring, backup, and storage of contents stored on third party servers, and is not intended to limit in any way the scope of the present disclosure. Alternate embodiments can involve multiple users storing their content on a plurality of third party servers with different hardware and software configurations.

FIG. 1 illustrates an exemplary scenario wherein the contents of a file (e.g., sample.doc) are changed by the user. It will be understood that in alternate embodiments, files (and the contents stored therein) can be deleted, added, replaced, or any other manipulations/modifications can be performed, as will occur to one of ordinary skill in the art. Further, these changes may be made by a hosting provider, hacker, or other persons, and may be done either intentionally or unintentionally. In an alternate embodiment, functionalities offered by the version control software are performed by the CRS 110.

Turning now to FIG. 2, an exemplary CRS architecture 200 is shown, involving architectural details of the Content Retrieval Manager 112 (comprising various software modules and components) communicating with a Third Party Content Storage 104 (third party server). As shown in the embodiment in FIG. 2, a Third Party Content Storage 104 includes a Third Party Content Storage Processor 206 for communicating with the CRS, and a Third Party Content Storage Database 208 that hosts the user's content. For example, a Third Party Content Storage Processor 206 may have specific configurations such as application programming interfaces (APIs) and web interfaces for developers and software programmers to access, monitor, and/or retrieve user's content hosted by the Third Party Content Storage 104. As shown in FIG. 2, the CRS 110 comprises a Content Retrieval Manager 112 and a CRS database 114 that are explained below.

In one aspect, the Content Retrieval Manager 112 communicates with the Third Party Content Storage Processor 206 over a network 106, in order to monitor and retrieve user's content and associated metadata. According to an embodiment of the present disclosure, the Content Retrieval Manager 112 further comprises several software modules, for example, a back end server 202 and a front end server 204. As referred to herein, a server can mean hardware components as well as software modules and engines that execute various processes on the hardware components. Typically, according to an embodiment, the back end server 202 typically performs periodic monitoring of the user's content, whereas the front server 204 interacts with the Third Party Content Storage 104 (third party server). According to one aspect, webmasters or system administrators affiliated with the Third Party Content Storage 104 provide access control information and information relating to user's content physically via a web interface. An exemplary screenshot showing a web interface will be discussed in connection with FIG. 11. According to another aspect, such types of information is obtained from the Third Party Content Storage 104 via APIs.

According to one aspect, the back end server 202 further comprises app server 202A, app server 202B, ... app server 202N. In one aspect, functionalities of a back end server 202 are performed by the individual app servers. However, in alternate embodiments, the app servers can perform various other functions and processes.

Similarly, the front end server 204 comprises web server 202A, web server 202B, ... web server 202N. Individual web servers typically perform the same function as the front end servers. It will be apparent to one of ordinary skill that the number of app servers or web servers depends on the computational capacities of each server, and the processing load imposed on them. No limitation is imposed on the number or configurations (both hardware and software) of such servers. In alternate embodiments of the CRS, a single app server and a single web server can suffice. In other alternate embodiments of the CRS, a single server that provides combined functionalities of a back end server 202 and a front end server 204 can be used.

As shown in FIG. 2, the CRS 110 comprises a CRS database 114 to store access control information and information relating to user's contents. Examples of access control information include (but are not limited to) FTP URL or a IP address of the location in the Third Party Storage wherein the user's contents are stored, username/password of the user's account in third party servers, name of a user's website, etc. An exemplary screenshot showing an interface to enter access control information is shown in FIG. 10. It will be recalled from the description accompanying in FIG. 1 that during a monitoring process, the CRS 110 creates an index list (discussed in greater detail in connection with FIG. 7) based on the information relating to user's contents, e.g., metadata. In one exemplary aspect, such an index list is also stored in the CRS database 114.

As will be understood and appreciated, software modules and databases discussed in the present disclosure are provided for exemplary purposes only. Various other software modules and databases can be used in alternate embodiments of the present disclosure. For example, in one embodiment, the Content Retrieval Manager 112 additionally comprises a FTP server that can be used by programmers and software developers as a development environment that can be used for purposes of modifying content (e.g., source code), and perform various other administrative functions as will occur to one skilled in the art.

FIG. 3 illustrates an exemplary high-level CRS process 300, as performed by an embodiment of the CRS 110 used for automated retrieval, monitoring, storage and backup of user's online content. As will be understood, according to one embodiment, various modules and software components (shown exemplarily in FIG. 2) that comprise an embodiment of the CRS 110 implement various steps of this flowchart. As shown, the CRS process 300 includes three primary sub-processes or sub-routines: an information retrieval process 400, content monitoring process 500, and a backup process 600. Further details of these sub-processes are explained in FIGS. 4-6.

Starting at process 400, the CRS 110 retrieves initial information from the Third Party Storage 104. Examples of initial information include a user's access credentials for the user's account hosted on the Third Party Storage 104, a first version of the user's data, and several other types of information. A first version of the user's data that is stored and backed up by the CRS 110 is usually a current version of the user's data at the time a first retrieval is made by the CRS. Hence, the earliest version of the user's data that the CRS 110 can revert back to is the version that is retrieved during process 400. According to one aspect, information retrieved from the Third Party Storage 104 is stored in a CRS database 114 or auxiliary storage 116. Additional details of sub-routine 400 will be recited in connection with FIG. 4.

At process 500 (details of which are shown in FIG. 5), the CRS 110 performs monitoring of the user's content stored in Third Party Storage 104 in order to detect changes in the user's content. Such monitoring is typically performed periodically at a predetermined time interval. As will be understood by one of ordinary skill in the art, the user, independent of the CRS 110, accesses his or her content and makes changes to his or her content, as and when necessary. Changes made by users are detected by the CRS 110 during a content monitoring process. As previously recited, an embodiment of the CRS 110 uses an index list (created using metadata associated with the user's content) to keep track of the changes to the user's content.

If changes are detected during the monitoring process, then the CRS 110 stores the user's changes during a backup process 600 (shown in greater detail in FIG. 6). If no changes are detected, the CRS 110 continues the content monitoring process 500. During a backup process, the CRS 110 by itself, or by leveraging functionalities of version control software, creates a repository containing incremental changes to the user's content from the previously stored version. It will be understood that previous versions can be stored in a CRS database 114 or in an auxiliary storage 116 that can be accessed by the CRS 110 over a network 106.

Now referring to FIG. 4, an exemplary information retrieval process 400 showing computer-implemented method steps involved in retrieval of initial information from the Third Party Storage 104 is described. Starting at step 402, the CRS 110 receives user credentials and other access control settings information from a Third Party Storage 104. An exemplary screenshot showing user credentials and other settings needed to access a user's account is shown in FIG. 10. A user's credentials and other access control information are provided to the CRS 110 by the users themselves, or by system administrators affiliated with the third party servers. In alternate embodiments, the CRS 110 receives such information via Application Program Interfaces (APIs). Examples of such settings include a username/password, a URL corresponding to a network location in the Third Party Storage 104 wherein the user's data is stored, and various other settings. Credentials received at step 402 are validated by the Third Party Storage 104 at step 404. Then, at step 406, the CRS 110 initiates a session with a Third Party Storage 104 over a communication protocol such as Secure File Transfer Protocol (SFTP), File Transfer Protocol (FTP), Secure Shell (SSH) or the like. In alternate embodiments, the CRS receives user credentials by integrating with various software plugins such as CPANEL™ and various others that are currently available as well as those that will occur to one of ordinary skill in the art.

At step 408, the CRS 110 retrieves metadata associated with the user's contents (data) from the Third Party Storage 104, and creates an index list of metadata. It will be understood that metadata typically refers to a set of data that describes and gives information about data. As referenced in the present disclosure, metadata provide information about the user's data (user content). Examples of metadata retrieved from the Third Party Storage 104 include a file name, a modification time, a modification date, a size of the corresponding file, and other attributes as will occur to one skilled in the art. As discussed above, the index list is used by the CRS 110 to track changes between two versions in the user's data—a local and a current version. A local version represents a version of the user's data that was retrieved previously from third party servers, and subsequently stored in an exemplary CRS database (or, auxiliary storage). On the other hand, a current version of the user's data represents a version that is presently stored in third party servers, and in the event it has undergone changes from the local version, will be retrieved during a backup process.

The first time the CRS 110 retrieves the user's content there are no locally stored copies of the user's data. Therefore, during this first retrieval, the index list is initialized to the metadata associated with the user's content. According to one aspect, system users and/or system administrators affiliated with the third party servers can indicate to the CRS a list of files (or folders) that do (or, alternately do not) need to be monitored and backed up. Accordingly, the CRS 110 creates the index list based on information provided by system users and/or system administrators. By default, the CRS 110 backs up every file and folder stored in the user's account on third party servers.

Still continuing with FIG. 4, at step 412, the CRS 110 retrieves the user's data from the third party servers. Next, at step 414, the CRS 110 executes version control software to create a repository of the user's data. According to one exemplary aspect, a version control software (or, alternately the CRS 110) automatically generates a summary list of changes that have occurred within every revision and a location in the database pointing to the last unchanged version of the file. Because such a list is being created at a first instance, such a list is initialized to indicate this is the oldest copy of the user's contents in the repository, and its corresponding location in the database.

Subsequently at step 416, the version control software (or, the CRS 110) compresses the user's contents and the index list (indicating the changes in user's content) and thereafter stores the same in a CRS database 114 or auxiliary storage 116. In alternate embodiments, the index list is stored in a CRS database 114 and the repository is stored in the auxiliary storage 116, or vice-versa. In what follows next, an embodiment of a monitoring process will be described in greater detail.

Referring to FIG. 5, a monitoring process 500 is described during which the CRS scans the current data on the third party servers, and the last stored version of the data in the CRS, for changes between the two versions. Starting at step 502, the CRS 110 initiates a session with a Third Party Storage 104 over a communication protocol such as SFTP, FTP, SSH or the like. At step 504, the CRS 110 retrieves metadata associated with the current version of the user's contents. Examples of metadata retrieved from the Third Party Storage 104 include a file name, a modification time, a modification date, a size of the corresponding file, and other attributes as will occur to one skilled in the art. Then, at step 506, the CRS 110 retrieves the index list that is stored locally in the CRS, e.g. in CRS database 114 or auxiliary storage 116. At step 508, the CRS 110 compares the index list and the retrieved metadata, for purposes of detecting changes. For example, the CRS 110 determines whether or not changes (including additions, deletions) have been made to the names of files and folders. The CRS 110 additionally determines whether or not a file has been renamed, or moved into a folder, or vice-versa. In an aspect of comparing the index list and the retrieved metadata, the CRS 110 also determines whether changes have occurred in connection with the size, the last modification time, or any other change or update as will occur to one of ordinary skill in the art.

During the comparison step, if one or more changes in the metadata are detected, then at step 510, the CRS 110 proceeds to a backup process 600 as described next. If no changes are detected, the CRS 110 loops back to step 502 and continues to monitor the user's content stored in third party servers for changes. Thus, it will be understood that the monitoring process 500 is repetitively performed at periodic intervals of time. Although not shown in FIG. 5, in alternate aspects of a monitoring process 500, the CRS 110 periodically determines the "health" and reliability of the retrieval data and/or the Third Party Storage 104, e.g., whether the third party server (and hence the data stored therein) has been exposed to phishing or malware activities. The results of analyzing the "health" of the user's data can be used to alert the user and/or the associated third party server. In the event a hack or an unauthorized change is detected, webmasters can quickly revert to the last known "good" version of the website or content data, and have their site restored.

Now referring to FIG. 6, a backup process 600 is described corresponding to backup of a current version of the user's content in response to changes in the user's content that are detected during the monitoring process 500. Starting at step 602, the CRS 110 retrieves content corresponding to metadata that has undergone changes as determined at step 508 in process 500. Next, at step 604, the CRS 110 executes version control software to create a repository of the user's data. According to one exemplary aspect, a version control software (or, alternately the CRS 110) automatically generates a summary list of changes that has occurred within every revision and a location (in an exemplary database) pointing to the last unchanged version of the file(s). Further, at step 606, the CRS 110 creates an index list of the metadata associated with the current version of the user's contents. According to one exemplary aspect, the CRS overwrites the previous index list with a current one every time a new index list is created during a backup phase. Finally, at step 608, the version control software (or, the CRS 110) compresses the user's content and the index list and thereafter stores the same in a CRS database 114 or auxiliary storage 116. According to one aspect, the compressed repository created by the CRS 110 or a version control software includes the incremental differences of the content between the most recently pre-stored version (available from the most recent revision) and a current version of the user's data. This way of storing the incremental differences allows efficient use of storage space. In what follows next, various attributes of a index list will be described in more detail.

Turning to FIG. 7, a schematic 700 of an index list 720 is shown comprising various metadata associated with a user's content. As shown in FIG. 7, an exemplary and illustrative list of a user's most recently pre-stored metadata 710A changes into current metadata 710B. As described herein, the changes in metadata are the result of changes in one or more files associated with the user's content (e.g., website). Exemplarily, metadata associated with the user's contents include a unique file name, a modification time, a modification date, a size of the corresponding file, and other attributes as will occur to one skilled in the art. Further, it will be understood that changes made by a user to the user's contents (data) will be reflected in the metadata associated with the user's contents. Various exemplary scenarios illustrating different ways in which metadata changes occur will now be described.

In FIG. 7, as shown, a file called file1 is unchanged, as apparent from the associated metadata in versions 710A and 710B. A file called file2 is modified on 10-30-2011 at 12:00 hrs from its previous 10:35 version, although the size of file2 does not change. In another instance, a file called file3 is modified by including additional contents, causing its size to change. A time and date corresponding to such changes are reflected in the metadata associated with the files. It is also shown that a file called file4 is added.

In one aspect, the aforementioned exemplary changes are detected by the CRS 110 in a comparison step carried out during a monitoring phase 500, and the outcome of the comparison step is used to create an exemplary index list 720. Since the metadata associated with file2, file3, and file4 have undergone changes, the CRS will retrieve contents of file2, file3, and file4 during a backup process. Details of a monitoring process 500 and a backup process 600 have been discussed previously in connection with FIG. 5 and FIG. 6 respectively.

Now referring to FIG. 8, an exemplary profile table 800 (stored in an exemplary CRS database 114) comprising several variables in connection with user content stored in third party servers is shown. As recited previously, in one aspect, the user content relates to a website. In such an example, the user content will usually comprise source code and other files associated with the website. Such an example is illustrated in profile table 800. In alternate embodiments, different types of user content and correspondingly different variables can be included in a profile table.

For example, as shown in FIG. 8, a "WebSite Name" column stores the name (e.g., www.mysite.com) of a user's website. Such an exemplary website is identified by a unique website ID (e.g., Website ID 1). Content relating to this website is stored exemplarily at a third party server (Third Party Storage 104) having server address (e.g., 192.168.1.110). A SFTP address of this server is exemplarily indicated as ftp.ftpserver1.com that can be accessed via an exemplary SFTP port 990.

In one aspect, the CRS 110 periodically scans the user's content to verify whether the contents of the user's site have been exposed to malicious attacks or hacks. In the event that such malicious attacks or hacks have occurred, then a user's website is not considered safe for browsing. Thus, a yes or a no in a "Safebrowsing ok" column indicates whether a user's website is "safe".

Additionally, a "Disk Usage" column indicates the total size (e.g., contents of the site with Website ID 1 occupies 21 MB) of the user's content. Further, a "Last Modified Time Stamp" column indicates a date/time (e.g. 10-31-2011 at 10:30 hrs) corresponding to the last modification of the content on the user's website. Changes to the user's content are usually identified by a revision number comprising a number and/or letter code combination such as a "CommitID". A "CommitID" column indicates a revision number (e.g., Last Commit ID 5 indicates that 5 different versions of the user's contents have been detected and backed up by the CRS 110). Furthermore, as will be understood by one having ordinary skill in the art, the profile table 800 is presented for illustrative purposes only, and embodiments of the present CRS 110 are not limited to data, information, and fields in the specific data table shown.

FIG. 9 illustrates an exemplary screenshot 900 of a CRS interface including an overview of user content stored in third party servers. For example, as summarized under a "My Sites" tab, a user's website called www.mywebsite.com occupies a size of 21 MB, is malware free (i.e., no malicious attacks or hacks), and is monitored successfully by the CRS. Further, various control settings related to the website can be configured by clicking on an "Edit" button in this page. An exemplary screenshot of such settings will be described next in connection with FIG. 10. In FIG. 9, another tab entitled "Secure Inbox" is shown. Details of this tab will be described in connection with FIG. 15.

In an exemplary embodiment, the CRS 110 allows users to setup multiple user accounts to retrieve and backup data relating to multiple websites, the data being stored with the same or different third party storage providers. Therefore, an "Add Site" button present in most CRS interfaces (including the interface shown in FIG. 9) provides the ability to add multiple sites to be monitored and backed up by the CRS. It will be understood that these sites may be hosted with the same or different third party server(s).

Now referring to FIG. 10, an exemplary screenshot 1000 displaying various settings/options associated with access and retrieval of content stored in third party servers, is shown. For example, as will be understood by one of ordinary skill, a "Website URL" box is used to enter a name of a user's website. A "Destination FTP URL or IP" box is used to indicate the FTP URL or a IP address of the location in the Third Party Storage wherein the user's contents are stored. An "Account" and a "Password" box indicate a name (username) and a password respectively, of a user's account. Users and system administrators can choose to receive notification alerts from the CRS when changes are detected, via email, SMS, MMS, or any other mechanism. A "Notifications Enabled" check-box provides such a functionality. Further, depending on the security policies or communication policies of the hosting provider (third party server), communications between the CRS and the hosting provider can be over a FTP or a secure FTP (SFTP) connection. In many scenarios, depending on the security policies or communication policies of the hosting provider, this connection proceeds via a non-standard network port. The port number for the connection can be entered via the interface shown in FIG. 10. By default, the CRS communicates with the hosting provider (third party server) via a standard, predetermined port number (e.g., 21).

Continuing with the description of FIG. 10, users can specify a directory location wherein the user content (that will be retrieved, monitored and backed up by the CRS) is located. In one aspect, the CRS performs a real-time check of whether the location is a valid location or not, and A "Check Directory" button is provided on the interface for that purpose. If a user clicks on the "Check Directory" button, then the CRS accesses that location and displays a list of the contents (including files and folders) in that location. An exemplary list is also displayed in the interface shown in FIG. 10. An "Update" button displayed in this interface 1000 saves the information (locally in CRS) relating to various settings/options provided by users, webmasters, or system administrators. Although not shown in FIG. 10, it will be understood that in alternate embodiments, the CRS obtains information in connection with various settings/options automatically by a software plugin or an API, as will occur naturally to one skilled in the art.

Next referring to FIG. 11, an exemplary screenshot is shown of a CRS interface displaying various settings/options associated with manual (user-initiated) backup of content stored in third party servers. In many scenarios, users, webmasters and system administrators prefer to have an on-demand backup of the user content. Such a functionality is provided in this interface. Particularly, a "Start Manual Backup" button can be clicked by a user to initiate an on-demand backup. After this button is clicked, the interface displays details for the this backup under an "Existing Backups" menu bar. Changes in the user's content that are detected by the CRS are displayed by clicking on a "Changes" button on this interface. An exemplary screenshot of an interface that appears after a user clicks on the "Changes" button will be discussed next in connection with FIG. 12.

As shown in FIG. 11, a "Time Machine" button is provided on the interface to automatically revert back to a previous version of the user's website (or, in general user's content) pre-stored in an exemplary CRS database. For example, in one embodiment, after the "Time Machine" button is clicked, the CRS displays a snapshot of a previous version of homepage (and other pages) of a user's website. In order to generate the snapshot, it will be understood and appreciated by one skilled in the art that the CRS processes the pre-stored data relating to the user's website.

In many scenarios, users, webmasters and system administrators prefer to receive a copy of the current version of the user's content (data) that is stored in the third party servers. A "Request zip" button on this interface provides the option of downloading into a local folder on the user's computer a compressed copy of the current version of the user's contents.

Referring now to FIG. 12, a screenshot 1200 of an exemplary CRS interface showing exemplary files (comprising user's content stored in third party servers) that have undergone changes is shown. Such a list (as will be recalled from the discussions in FIG. 11) is typically the outcome of an on-demand backup initiated by a user. As shown in FIG. 12, the interface indicates a timestamp when the monitoring was performed by the CRS, statistics relating to the monitoring, and the names of the files contained in the user's content. For example, the interface reveals that there were 716 additions in total, and nothing was deleted. In one exemplary aspect, the CRS specifies the number of lines added to a file, the number of files deleted from a file, and a total number of lines contained in the file. For example, the CRS specifies this information in the following format: /path/file name (lines added to file, lines deleted from file, total lines). Thus, as shown, nine (9) new lines were added to the file called ".htaccess" and no lines (that existed previously) were deleted. Similarly, fifty-five (55) new lines were added to the file called "mycode.cpanelplugin" and no lines were deleted. As will be understood, in alternate embodiments, the CRS displays various other information to users, and moreover, such information can be displayed in different screen layouts and formats. In what follows next, an exemplary screenshot showing user configuration settings associated with providing notification alerts to users, will be described next.

Now referring to FIG. 13, a screenshot 1300 of an exemplary CRS interface is illustrated showing various CRS settings/options associated with providing notification alerts, according to one embodiment of the present system. For example, users can choose to be notified (or not) when backups are performed. They can also choose various ways of receiving the notifications, such as SMS, email, MMS, or any other mechanism. Further, as will be recalled, the CRS monitors the user's content at predetermined intervals (hourly, daily, etc.). According to one aspect, such an interval can be specified by users based on their preferences. In another aspect, users can also choose to be notified only when substantive changes occur to the content, i.e., for minor changes or changes that involve changes in system files, caches and the like, users may choose not to be notified by the CRS. Various illustrative details associated with a monitoring and backup of user's content are described next.

Turning to FIG. 14, a screenshot 1400 is shown of an exemplary CRS interface displaying a summary of the monitoring and backup of user's content stored in third party servers, according to one embodiment of the present system. As shown, constituents of the user's contents (in terms of different file name extensions or format) is shown with the help of a pie-chart under a "File Mix" menu. For example, it is shown that there are 8 .htm files, 87 .php files, 16 .mo files, etc. As will be understood, no limitations are imposed on the number or type of files that comprise the user's contents, or that are monitored by embodiments of the CRS 110.

Additionally, the outcome of monitoring the "health" of the user's content is displayed in a "Site Health" menu. According to one aspect, the CRS checks the user's contents against a constantly updated list of suspected phishing and malware sources. Such a list is maintained from information pre-stored within the CRS, as well as information released by computer security companies and other sources.

In another exemplary aspect, the CRS provides confirmation relating to the monitoring and backup of user's content. For example, as shown in FIG. 14, a user's site was last backed up Oct. 27, 2011 at 1:37 UTC. A confirmation code relating to this backup is also displayed on the interface, along with a current size of the user's contents. In what follows next, a screen displaying notification alerts to users will now be described.

FIG. 15 illustrates a screenshot 1500 of an exemplary CRS interface showing various notification alerts that are provided by the CRS 110 to system administrators, web masters, and/or website owners summarizing the effects of monitoring of user's content stored in third party servers, according to one embodiment of the present system. As shown, in one instance, no changes were detected in the user's content by the CRS during a monitoring process, and such a notification alert is displayed on the interface. It can be seen that users may choose to delete notifications (by clicking on a "Delete" button) after reviewing them.

The discussions above in association with various flowcharts and screenshots merely provide an overview of an embodiment of the present system describing the automated retrieval, monitoring, backup and storage of a user's online digital content and are not intended to limit in any way the scope of the present disclosure. Such content exemplarily includes source code and files for hosting websites, audio files, video files, data files, system files, image files, or any other content that is typically stored in third party servers. Accordingly, various modifications to represent further embodiments of the present disclosure are possible, as will be understood by one of ordinary skill.

Accordingly, it will be understood from the foregoing description that various embodiments of the present system described herein are generally implemented as a special purpose or general-purpose computer including various computer hardware as discussed in greater detail below. Embodiments within the scope of the present disclosure also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hard-wired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, the present disclosure is described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the present disclosure may be practiced in network computing environments with many types of computer system configurations, including personal computers, hand-held devices, multi-processor systems, microprocessor-based or programmable consumer electronics, networked PCs, minicomputers, mainframe computers, and the like. The present disclosure is practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the present disclosure, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the present disclosure will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which aspects of the present disclosure are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the present disclosure is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present disclosure, it readily will be understood by those persons skilled in the art that the present disclosure is susceptible to broad utility and application. While various aspects have been described in the context of a preferred embodiment, additional aspects, features, and methodologies of the present disclosure will be readily discernable from the description herein, by those of ordinary skill in the art. Many embodiments and adaptations of the present disclosure other than those herein described, as well as many variations, modifications, and equivalent arrangements and methodologies, will be apparent from or reasonably suggested by the present disclosure and the foregoing description thereof, without departing from the substance or scope of the present disclosure. Furthermore, any sequence(s) and/or temporal order of steps of various processes described and claimed herein are those considered to be the best mode contemplated for carrying out the present disclosure. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present disclosure. In addition, some steps may be carried out simultaneously.

Accordingly, while the present disclosure has been described herein in detail in relation to preferred embodiments, it is to be understood that this disclosure is only illustrative and exemplary of the present disclosure and is made merely for purposes of providing a full and enabling disclosure. The foregoing disclosure is not intended nor is to be construed to limit the present disclosure or otherwise to exclude any such other embodiments, adaptations, variations, modifications and equivalent arrangements, the present disclosure being limited only by the claims appended hereto and the equivalents thereof.

What is claimed is:

1. A computer-implemented method for automated monitoring and storage of digital website content maintained at a third party server, wherein the third party server is operated independently of and is in wireless communications with a Content Retrieval System (CRS) that is authorized to access the digital website content, comprising the steps of:

automatically retrieving from a CRS database a first index list comprising metadata associated with a first version of a particular digital website;

automatically communicating to the third party server a request for current metadata associated with a second version of the particular digital website;

in response to receipt at the CRS of the current metadata associated with the second version of the particular digital website, automatically comparing the current metadata to the first index list of metadata associated with the first version of the particular digital website;

identifying one or more changes in the second version of the particular digital website as compared to the first version of the particular digital website based on the comparison between the current metadata associated with the second version of the particular digital website and the first index list;

retrieving from the third party server digital website content corresponding only to the identified one or more changes between the second version and the first version of the particular digital website;

generating a second index list comprising the current metadata associated with the second version of the particular digital website;

associating the retrieved digital website content corresponding only to the identified one or more changes between the second version and the first version of the particular digital website with the second index list in the CRS database;

automatically and periodically comparing the retrieved digital website content corresponding only to the identified one or more changes between the second version and the first version of the particular digital website to one or more predefined phishing, malware, or hacking activities; and upon determination that the retrieved digital website content corresponding only to the identified one or more changes between the second version and the first version of the particular digital website matches at least one of the one or more predefined phishing, malware, or hacking activities, reverting the second version of the particular digital website back to the first version of the particular digital website.

2. The method of claim 1, whereby the second index list is used in a subsequent comparison process.

3. The method of claim 1, wherein the step of automatically communicating to the third party server further comprises the steps of:

receiving access credentials relating to the particular digital website; and providing the access credentials to the third party server for authorization to access the particular digital website.

4. The method of claim 1, wherein the particular digital website comprises a plurality of files selected from the group comprising: source code, text files, audio files, video files, data files, system files, image files, system caches, log files.

5. The method of claim 1, wherein metadata associated with the particular digital website is selected from the group comprising: file names, folder names, file type, content type, date, time, modification date, modification time, file size, folder size, content size.

6. The method of claim 1, further comprising the step of providing notification alerts to system users based on changes in the second version of the particular digital website.

7. The method of claim 6, wherein the notification alerts are provided via one or more of the following: email, text message, MMS, social media post, telephone message, hard copy, user interface display.

8. The method of claim 1, wherein the retrieved digital website content corresponding only to the identified one or more changes between the second version and the first version of the particular digital website is stored in the CRS database in an incremental manner with respect to the first version of the particular digital website.

9. The method of claim 1, wherein the retrieved digital website content corresponding only to the identified one or more changes between the second version and the first version of the particular digital website is compressed in the CRS database.

10. A computer-implemented method for automated monitoring and storage of digital website content maintained at a third party server, wherein the third party server is operated independently of and is in wireless communications with a Content Retrieval System (CRS) that is authorized to access the digital website content, comprising the steps of:

automatically and periodically receiving current metadata associated with a current version of a particular digital website from the third party server;

automatically and periodically retrieving from a CRS database a prior index list comprising pre-stored metadata associated with a prior version of the particular digital website;

comparing via the CRS the current metadata to the prior index list to detect one or more differences between the current metadata and the pre-stored metadata, wherein the one or more differences between the current metadata and the pre-stored metadata are indicative of one or more differences between the current version of the particular digital website and the prior version of the particular digital website;

if the one or more differences between the current metadata and the pre-stored metadata are detected, retrieving from the third party server one or more specific website digital content files associated only with the current metadata corresponding to the one or more differences between the current metadata and the pre-stored metadata;

automatically generating a current index list via the CRS corresponding to the current metadata associated with the current version of the particular digital website;

associating the current index list with the retrieved one or more specific website digital content files;

storing the current index list and the retrieved one or more specific website digital content files in the CRS database;

automatically and periodically comparing the retrieved one or more specific website digital content files to one or more predefined phishing, malware, or hacking activities; and upon determination that the retrieved one or more specific website digital content files matches at least one of the one or more predefined phishing, malware, or hacking activities, reverting the current version of the particular digital website back to the prior version of the particular digital website.

11. The method of claim 10, further comprising the step of prior to receiving the current metadata associated with the current version of the particular digital website from the third party server, initiating a secure wireless communications session via the CRS with the third party server.

12. The method of claim 10, wherein the particular digital website comprises a plurality of files selected from the group comprising: source code, text files, audio files, video files, data files, system files, image files, system caches, log files.

13. The method of claim 10, wherein metadata associated with the particular digital website is selected from the group comprising: file names, folder names, file type, content type, date, time, modification date, modification time, file size, folder size, content size.

* * * * *